May 21, 1968 J. D. OWEN 3,384,750

BOREHOLE DEVIATION DETECTOR

Filed May 25, 1964 2 Sheets-Sheet 1

INVENTOR.
J.D. OWEN

BY *Young & Quigg*

ATTORNEYS

INVENTOR.
J.D. OWEN

BY *Young & Quigg*

ATTORNEYS

United States Patent Office 3,384,750
Patented May 21, 1968

3,384,750
BOREHOLE DEVIATION DETECTOR
Joe D. Owen, Bartlesville, Okla., assignor to Phillips Petroleum Company, a corporation of Delaware
Filed May 25, 1964, Ser. No. 369,671
4 Claims. (Cl. 250—83.3)

This invention relates to a device and method for determining deviation of a borehole. In a specific aspect the invention relates to a novel and improved inclinometer.

The utilization of photographic means in a logging tool to determine the deviation of a borehole has the disadvantages of providing information on an intermittent basis and the information is available only after the run is completed and the tool withdrawn from the borehole. The recent innovation of utilizing electrical sensing elements permits a continuous signal but encounters electrical and mechanical difficulties. Mechanical contacts are subject to wear and the electrical characteristics of capacitance and inductance are in several directions in a particular plane.

It is an object of the invention to provide novel and improved means and method for determing deviation of a borehole. It is an object of the invention to provide a deviation sensing means which does not require mechanical contacts. It is another object of the invention to provide a novel means for accurately sensing deviation from the vertical.

Other aspects, objects and advantages of the invention will be apparent from a study of the disclosure, the drawings and the appended claims.

In accordance with the invention there is provided a housing adapted to be lowered into a borehole, a pendulum mounted in said housing, a radiation source positioned on the pendulum, and radiation detecting means for determining the position of the pendulum with respect to the lengthwise axis of the housing.

Figure 1:
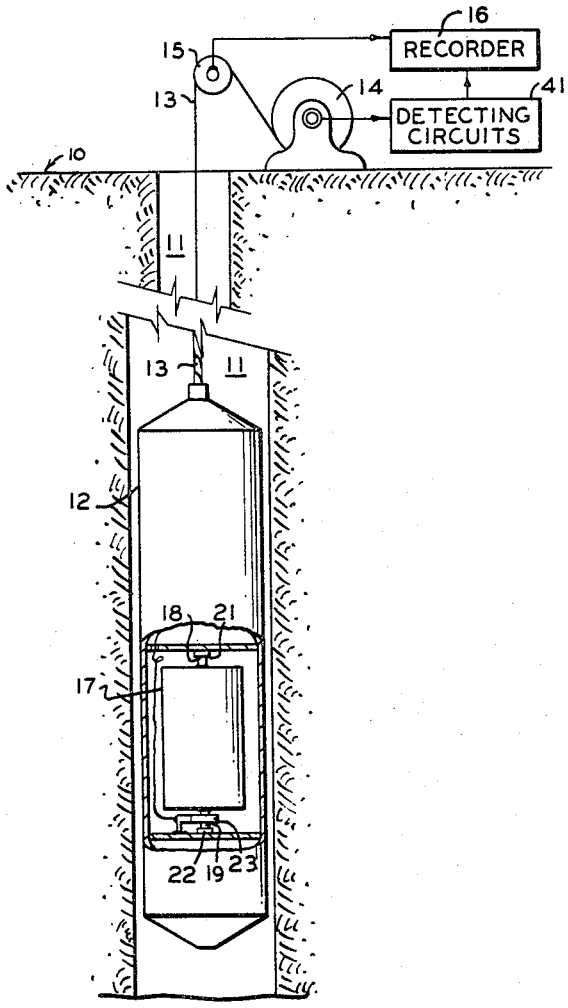
Figure 2:
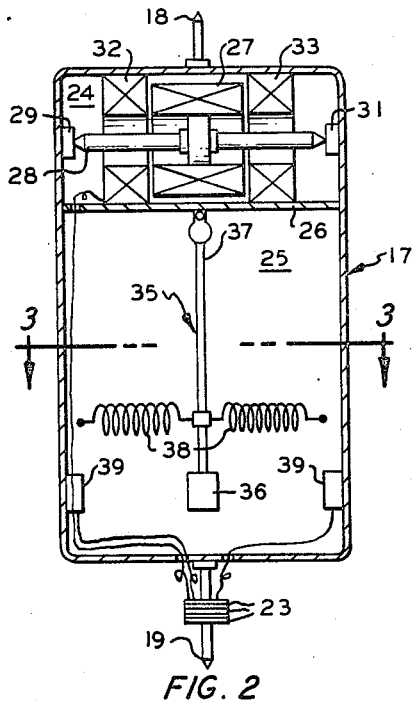
Figure 3:
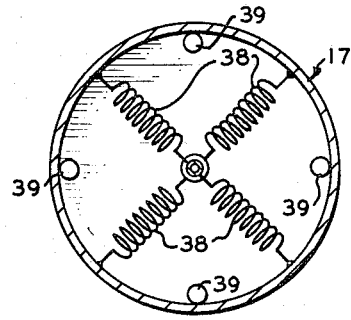
Figure 4:
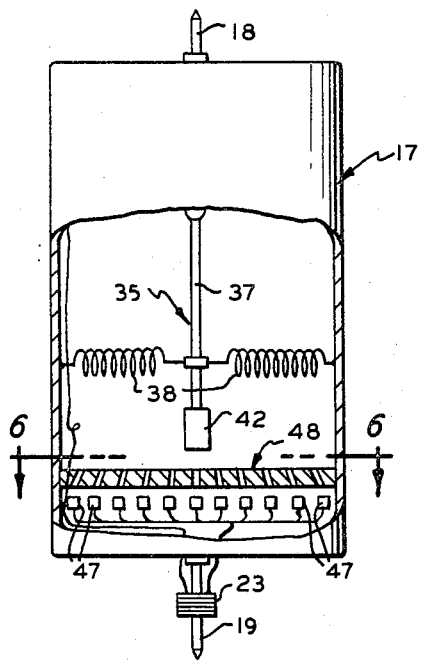
Figure 7:
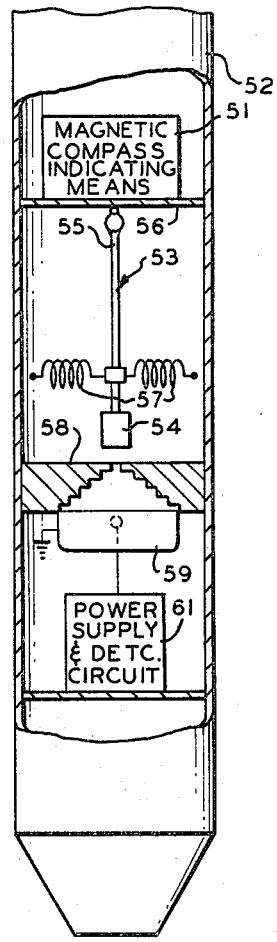
Figure 5:
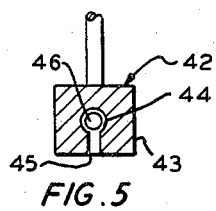
Figure 6:
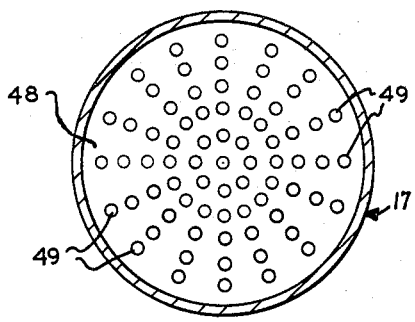

In the drawings FIGURE 1 is a view partly in elevation and partly in section of a logging sonde containing a deviation sensing means in accordance with the present invention; FIGURE 2 is an enlarged transverse sectional view of one embodiment of the deviation detecting means of FIGURE 1; FIGURE 3 is a sectional view taken along line 3—3 in FIGURE 2; FIGURE 4 is an elevation view, partly in section, of another embodiment of the deviation sensing means of FIGURE 1; FIGURE 5 is an elevation cross-sectional view of the radiation source of FIGURE 4; FIGURE 6 is a sectional view taken along line 6—6 in FIGURE 4; and FIGURE 7 is a view partly in elevation and partly in section of a logging sonde containing a deviation sensing means in accordance with another embodiment of the invention.

Referring now to the drawings and to FIGURE 1 in particular, numeral 10 refers to the surface of the earth adjacent borehole 11. Logging sonde 12 is positioned within borehole 11 by means of cable 13 having associated therewith a suitable number of conductors. Cable 13 is wound around cable reel 14 and passes over depth measuring device 15. The depth measuring device is mechanically or electrically connected to the driving means of recorder 16 to provide a correlation between the depth of housing 12 and the deviation signal.

Located within housing 12 is a casing 17 which contains a means for measuring the inclination of the housing 12 within borehole 11 and a means such as a gyroscope for maintaining the casing 17 fixed regardless of the rotational movement of housing 12. Casing 17 is pivotally mounted in housing 12 by means of pivots 18 and 19 which are pivotally mounted in pivot sockets 21 and 22, respectively. Slip rings 23 are mounted on pivot 19 to provide power connections for the gyroscope and the radiation detectors as well as for the output circuits of the radiation detectors.

Referring now to FIGURE 2, casing 17 is divided into an upper section 24 and a lower section 25 by means of partition member 26. The upper section 24 contains a means such as a gyroscope for maintaining casing 17 in a fixed azimuthal direction. The gyroscope can consist of an armature 27 which is mounted upon shaft 28. Shaft 28 is the gyroscope axis of rotation and is mounted in pivot sockets 29 and 31. The armature is rotated by means of field coils 32 and 33 which are connected through slip rings 23 to a suitable source of power, for example a two phase alternator (not shown).

Provided within the lower section 25 is a pendulum 35 comprising a pendulum weight 36 and a pendulum support member 37. The upper end of member 37 is attached to partition member 26 by any suitable means; for example where member 37 is sufficiently flexible, the upper end thereof can be rigidly secured to member 26, and where member 37 is not sufficiently flexible the upper end thereof can be rotatably secured to member 26 by suitable means, for example a ball and socket joint. Pendulum 35 is thus free to remain vertical regardless of the direction of deviation from the vertical by housing 12. In accordance with the present invention, the pendulum weight comprises a suitable source of radiation, for example, a source of alpha particles such as Po 210 or Pu 239. While an alpha particle source is the presently preferred radiation source, it is within the contemplation of the invention to utilize other types of radiation including gamma rays, beta particles, neutrons, visible light, infrared radiation, and ultraviolet radiation. The radiation source can be a part of or the entire pendulum weight and can be attached in any suitable manner. For example, for an alpha particle source Po 210 or Pu 239 can be plated onto the core of the weight member. As shown in FIGURES 2 and 3, a plurality of spring members 38, preferably at least three, can be secured between pendulum 35 and various points along the inner wall of casing 17 to provide a dampening of the movement of the pendulum 35. This dampening is, in effect, a calibration of the inclinometer to make the pendulum more or less sensitive to a given change in the angle of deviation, that is the angle between the pendulum axis and the axis of casing 17 can be equal to or a percentage of the angle of deviation between the axis of casing 17 and the vertical. A plurality of suitable radiation detectors 39 are mounted on the inner wall of casing 17 to measure the amount of radiation received from the radiation source on the pendulum 35. Where it is desired to merely determine the amount of deviation without determining the direction of the deviation, a single detector mounted coaxially with casing 17 can be utilized. Where, however, it is also desired to determine the direction of deviation three or more radiation detectors can be utilized. It is also within the contemplation of the invention to provide two or more types of radiations and/or different energy levels of the same type of radiation at the radiation source and thus permit the use of detectors selectively sensitive to each type or energy level of radiation. Where two detectors are utilized, they can be mounted on a chord sufficiently displaced from the diameter of casing 17 to limit the possible locations of the pendulum 35 within casing 17 to a single position.

When casing 17 is in the gravitational vertical position, the lengthwise axis of casing 17 and the axis of pendulum 35 coincide with the result that the radiation detected by each of detectors 39 is equal. This position defines the zero position of the output recorders. As the housing 12 moves from the vertical, pendulum 35 will remain vertical causing the radiation source to be nearer one radiation detector and further away from the oppositely mounted detector. When dampening means 38 are utilized, the position of pendulum 35 can depart from the gravitational vertical, but the angle between the pendulum 35 and the axis of housing 12 is still proportional to the true angle of inclination. The outputs of detectors 39 can be combined in detecting circuits 41 to produce a first output signal representing the magnitude of the deviation and a second output signal representative of the direction of the deviation. If desired, these output signals can be represented by the amplitude and phase of a single signal with respect to a standard.

Referring now to FIGURE 4, there is illustrated a modification of the radiation detector system of FIGURE 2 wherein the same numeral refers to the corresponding element of FIGURE 2. In this embodiment the pendulum weight 42 is a collimated radiation source, as shown in FIGURE 5, and comprises a body 43 of radiation shielding material having a cavity 44 and a collimating passageway 45. The source 46 of radiation is positioned within cavity 44 to permit the passage of a narrow beam of radiation through passageway 45. Passageway 45 is preferably coaxial with pendulum 35. A plurality of radiation detectors 47 are positioned in a matrix to selectively detect the various positions of pendulum weight 42. If desired, a masking member 48 can be positioned between the radiation source 46 and radiation detectors 47 with the masking members 48 being formed of radiation shielding material and having a plurality of passageways 49 therethrough corresponding in number and positions with the number and positions of the radiation detectors 47. If the thickness of member 48 is considerably greater than the diameter of passageways 49, the passageways 49 can be positioned so that the axes thereof extend through the pivot point of pendulum 35 as well as the respective radiation detector. The output of each of the detectors can be assigned a particular amplitude and phase relation with respect to a standard. Another method for observing the output is to utilize a matrix of small electric lamps arranged in the same geometrical array as the detector matrix with a camera taking pictures at a preset rate, for example one frame per foot logged. Other suitable methods of readout are known or are obvious.

Referring now to FIGURE 7, there is illustrated still another embodiment of the invention. While the presently preferred embodiment of FIGURES 1 and 2 utilize a gyroscope to avoid the problems of local magnetic fields upsetting the accuracy of measurements made with magnetometers, it is within the contemplation of the invention to utilize means other than the gyroscope for determining orientation of the inclinometer. Thus in FIGURE 7 a suitable magnetic compass indication means 51 is mounted in sonde housing 52. Pendulum 53, comprising pendulum weight 54 and pendulum support member 55, is suspended from partition member 56. Springs 57 can be utilized to provide a desired dampening of pendulum 53. A graduated radiation absorber member 58 is positioned in housing 52 below pendulum 35. Member 58 can be graduated in the manner illustrated in FIGURE 7 to provide minimum radiation absorption when pendulum 53 and housing 52 are coaxial and increasing radiation absorption as the angle between the pendulum 53 and the axis of housing 52 increases. Other graduated absorption patterns can be utilized. A single radiation detector, for example proportional counter 59, can be utilized where only the amount of deviation is required or where the graduated absorber provides a unique absorption factor for each value of deviation angle and direction. A plurality of detectors in an array, for example as shown in FIGURE 4, can be utilized. Power supply and detector circuit 51 provides the necessary electrical power and detector output circuits. Where desirable, the housing or casing can be made of or have positioned therein means for shielding the radiation detectors from stray radiation.

Reasonable variation and modification are possible within the scope of the foregoing disclosure, the drawings and the appended claims to the invention.

I claim:

1. An inclinometer comprising a housing adapted to be lowered into a borehole, means positioned in said housing for indicating a fixed azimuthal orientation, a pendulum weight suspended in said housing by a pendulum support member, an uncollimated radiation source constituting at least part of said pendulum weight, said source of radiation being a source of radiation selected from the group consisting of alpha particles, beta particles, gamma rays, neutrons, visible light, infrared radiation and ultraviolet radiation, and means positioned in said housing for detecting the angle of inclination between said pendulum support member and the axis of said housing and the direction of said angle of inclination with respect to said fixed azimuthal orientation comprising at least three uncollimated detectors capable of measuring radiation from said source of radiation, said at least three detectors being positioned in said housing spaced apart from one another to detect equal amounts of radiation when the lengthwise axis of said housing and the axis of said pendulum support member coincide, means connected to said pendulum support member for dampening the movement of said pendulum support member, means connected to the outputs of said detectors to establish a first output signal representative of the magnitude of the deviation and a second output signal representative of the direction of the deviation.

2. An inclinometer in accordance with claim 1 wherein said means for dampening comprises a plurality of spring members connected between said pendulum support member and spaced points along the inner wall of said housing.

3. An inclinometer in accordance with claim 2 wherein said means for indicating a fixed azimuthal orientation comprises a gyroscope.

4. An inclinometer in accordance with claim 3 wherein said source of radiation comprises an alpha particle source.

References Cited

UNITED STATES PATENTS

| | | | |
|---|---|---|---|
| 1,889,114 | 11/1932 | Smith et al. | 33—205.5 |
| 2,320,643 | 6/1943 | Neufeld | 250—83.6 |
| 2,322,634 | 6/1943 | Howell et al. | 250—83.6 |
| 2,378,526 | 6/1945 | Agnew | 250—231 X |
| 2,725,486 | 11/1955 | Walstrom | 250—83.6 |
| 2,806,295 | 9/1957 | Ball | 33—205.5 |
| 2,933,601 | 4/1960 | Friedman | 250—43.5 |
| 2,986,639 | 5/1961 | Josendal et al. | 250—83.6 |

RALPH G. NILSON, *Primary Examiner.*

S. ELBAUM, *Assistant Examiner.*